United States Patent Office 3,432,486
Patented Mar. 11, 1969

3,432,486
SYNTHESIS OF FURAN COMPOUNDS INCLUDING PHARMACOLOGICALLY ACTIVE FURYL STEROIDS
Hitoshi Minato, 2-3-9 Matsugaedori, Toyonaka-shi, Osaka, Japan
No Drawing. Filed Mar. 24, 1966, Ser. No. 537,027
Claims priority, application Japan, Apr. 1, 1965, 40/19,357
U.S. Cl. 260—210.5
Int. Cl. C07c *167/00, 173/00;* C07d *5/16*
28 Claims

ABSTRACT OF THE DISCLOSURE

An $\alpha,\beta$-unsaturated $\gamma$-lactone is reduced according to the following scheme:

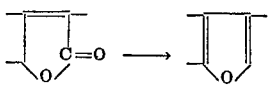

The reduction is effected with a compound of the formula $$M_nAlR_mH_{(n+3)-m}$$

wherein M is an alkali metal, R is a lower alkyl or lower alkoxy group, n is zero or 1 and m is zero to 3, when n is zero, and is zero to 4 when n is 1. Obtained furanes are useful pharmacologically.

---

This invention relates to furan compounds. More particularly, the present invention relates to a process for preparing furan compounds, in which the reaction is originally novel. In addition, the present invention relates to steroidal furan compounds being useful as medicaments, food additions, animal feed additions or intermediates thereof.

Hitherto, a vast amount of work has been reported concerning with synthesizing methods of furan compounds. However, most of these known methods are carried out under so drastic conditions that they can not be safely applied to compounds having unstable or complicated structures or various functional groups and the yields of them are restrained at low levels. Furthermore, the furan compounds being preparable by those known methods are structurally restricted by the available starting materials. So, they are inconvenient especially for construction of (I) the furan ring at a desired position in high molecular or structurally complicated compounds, (II) the furan ring containing various substituents at desired positions and (III) the furan compounds having the other functional groups.

On the other hand, although the $\gamma$-lactone ring is a five-membered heterocyclic ring containing one oxygen atom in its ring system, its direct conversion into the furan ring has never been achieved. From various studies on such a conversion, the inventor of the present invention has discovered that an $a,\beta$-unsaturated $\gamma$-lactone can be reduced with a certain kind of the aluminum compound to afford a corresponding furan compound. And, on this basis, the inventor has now established a new method for synthesizing furan compounds characterized particularly in a sufficiently moderate reaction condition, a broad scope of the applicability and an excellent yield. The inventor has also discovered a certain series of new steroidal furan compounds prepared by the present process that show remarkable pharmacological activities.

Accordingly, a fundamental object of the present invention is to embody a new generally applicable process for preparation of furan compounds. Another object is to embody the steroidal furan compounds. A further object is to embody the steroidal furan compounds having pharmacological activities. These and other objects will be apparent to those conversant with the art to which the present invention pertains from the subsequent description.

The process of the present invention comprises reducing an $\alpha,\beta$-unsaturated $\gamma$-lactone compound with a certain kind of the aluminum compound and is representable by the following partial formula scheme showing only the indispensable part:

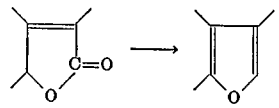

The process of the present invention is generally applicable to $\alpha,\beta$-unsaturated $\gamma$-lactone compounds, and any aliphatic, alicyclic and heterocyclic compounds which may have (an) aromatic substituent(s) can be employed as the starting materials, so far as they have an $\alpha,\beta$-unsaturated $\gamma$-lactone ring system. The lactone ring may be substituted at any position(s) and also may be a fused type to an alicyclic or heterocyclic ring. Even if the starting materials have the other functional groups, the process of the present invention can be safely applied to, because the reaction is executed under an extremely mild condition. By the same reason, the present process is particularly valuable in the synthesis of a high molecular furan compound of, for instance, the terpenoid series, the alkaloid series, the steroid series and the other synthetic high molecular furan derivatives. Various methods have been well known for the preparation of the $\alpha,\beta$-unsaturated $\gamma$-lactone compounds. One typical example of the conventional methods is the enamine procedure, which comprises formation of an enamine such as pyrrolidine enamine from a ketone, alkylation with an $\alpha$-halogeno-carboxylic ester followed by hydrolysis and treatment of the resulting ketoacid with acetic anhydride and sodium acetate under heating as represented by the following partial formula scheme showing only the indispensable part:

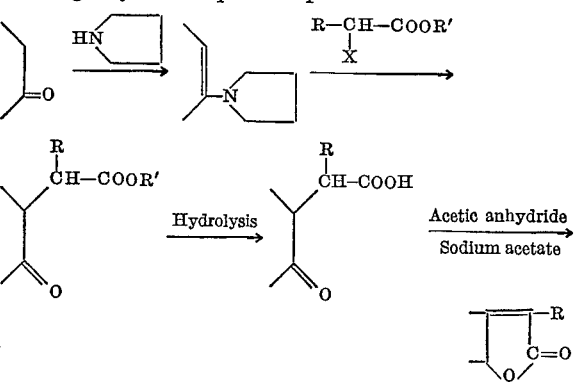

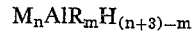

wherein R is a hydrogen atom a hydrocarbon residue or the like, R' is a lower alkyl radical and X is a halogen atom.

According to the present invention, the preparation of furan compounds is carried out by treating the starting $\alpha,\beta$-unsaturated $\gamma$-lactone compound with an aluminum compound of the following formula:

$$M_nAlR_mH_{(n+3)-m}$$

wherein M is an alkali metal, R is a lower alkyl radical or a lower alkoxy radical, n is an integer 0 or 1 and, m is an integer from 0 to 3 when n is 0, and m is an integer from 0 to 4 when n is 1, in an inert solvent at a wide range of temperature from about —90° C. to a reflux temperature. Examples of the aluminum compound employed contain lithium aluminum hydride, methyl lithium aluminum hydride, ethyl lithium aluminum hydride, propyl lithium aluminum hydride, isopropyl lithium aluminum hydride, butyl lithium aluminum hydride, isobutyl lithium aluminum hydride, diethyl lithium aluminum hydride, diisopropyl lithium aluminum hydride, tripropyl lithium aluminum hydride, triisobutyl lithium aluminum hydride, tetraethyl lithium aluminum, methoxy lithium aluminum hydride, ethoxylithium aluminum hydride, propyloxy lithium aluminum hydride, isopropyloxy lithium aluminum hydride, butyloxy lithium aluminum hydride, isobutyloxy lithium aluminum hydride, dimethoxy lithium aluminum hydride, dipropyloxy lithium aluminum hydride, triethoxy lithium aluminum hydride, triisopropyloxy lithium aluminum hydride, lithium aluminum tetrabutyloxide, aluminum hydride, methyl aluminum hydride, ethyl aluminum hydride, propyl aluminum hydride, isopropyl aluminum hydride, butyl aluminum hydride, isobutyl aluminum hydride, diethyl aluminum hydride, diisopropyl aluminum hydride, tripropyl aluminum, triisobutyl aluminum, methoxy aluminum hydride, ethoxy aluminum hydride, propyloxy aluminum hydride, isopropyloxy aluminum hydride, butyloxy aluminum hydride, isobutyloxy aluminum hydride, dimethoxy aluminum hydride, dipropyloxy aluminum hydride, aluminum triethoxide, aluminum triisopropyloxide and the like. Among these aluminum compounds as the reducing agent, a di-lower-alkyl aluminum hydride (e.g., diethyl aluminum hydride, diisopropyl aluminum hydride, diisobutyl aluminum hydride) and a tri-lower-alkyl aluminum (e.g., triisopropyl aluminum, triisobutyl aluminum) are most preferred from the viewpoint of the reaction efficiency. In many cases, the objective furan compounds can be produced by these reducing agents in almost quantitative yields. As the inert solvent employed, there are exampled a liquid hydrocarbon such as petroleum ether, petroleum benzin, ligroin, benzene and toluene and an ether such as diethyl ether, dipropyl ether, dibutyl ether, diglyme (diethyleneglycol dimethyl ether), tetrahydrofuran, tetrahydropyran and dioxan. Although the process can be practiced at a wide range of temperature from about −80° C. to a reflux temperature, it is preferable to carry out the reduction at −50 to −10° C. It is also preferred to carry out the reduction under stirring in an atmosphere of an inert gas such as nitrogen or argon, especially when the aluminum compound having alkyl radical(s) is used. Usually, the reduction is completed within 0.5 to 5 hours. After the reduction, the reaction mixture is added with water or an organic or inorganic acid such as hydrochloric, hydrobromic, sulfuric, benzene-sulfonic or acetic acid and extracted with a suitable water-immiscible organic solvent to isolate the objective furan compound. Alternatively, after the decomposition with water or the acid, the precipitated product may be collected by filtration. The thus isolated product, if necessary, may be further purified by a conventional manner such as distillation, recrystallization, chromatography and the like.

In rare cases, there is obtained an intermediary hydroxyl compound of the following partial formula showing only the indispensable part:

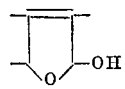

But, it can be easily and quantitatively dehydrated to give the objective furan compound by treatment with an organic or inorganic acid as mentioned above at a room temperature.

The synthesis of furan compounds are very important in the chemical industry, since there are many furan compounds being useful as medicaments, bactericides, disinfectants, spices, the other various synthetic chemicals and intermediates thereof. Therefore, the process of the present invention is extremely useful in such various industrial fields, especially by its broad applicability and excellent yield.

Although, in one aspect, the present invention relates to a novel and generally applicable process for the synthesis of furan compounds as described above, it relates also to furyl steroids having pharmacological activities which can be prepared by the aforementioned method in another aspect.

The furyl steroids of the present invention can be represented by the following general formula:

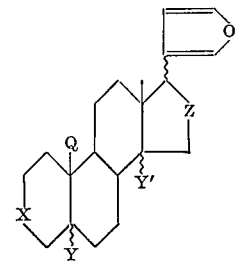

wherein Q represents —CH$_3$, —CH$_2$OH or —CHO; X represents

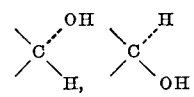

or >C=O; Y and Y' each represents —H or —OH; Z represents >CH$_2$,

or

a double bond can exist between 4- and 5-positions or between 5- and 6-positions; when the double bond exists, the radical represented by Y is absent; further one or two double bonds can exist between 14- and 15-positions or/ and 16- and 17-positions; when the double bond exists between 14- and 15-positions, the radical represented by Y' is absent; when the double bond exists between 16- and 17-positions, the radical represented by Z is ≧CH; and the ripple mark (⌇) is a generic indication of both α– and β-configurations. In this connection, it should be understood that the formula shows the substantial structure of the objective compounds, functionally modified compounds—including acylates and glycosides—being omitted. Thus, any hydroxyl radical except at 5- and 14-positions is intended also to represent such radicals properly acylated. The said acyl moiety is preferably derived from carboxylic acid having one to about twelve carbon atoms, conventionally employed in the steroid art. Still more, the hydroxyl radical at 3-position can be linked with a sugar moiety to form a glycoside linkage. The said sugar moiety is originated from the naturally occurring cardiac glycosides, and the glycosides include mono-, di-, tri- and tetraglycosides. Thus, the glycosyl radical includes one to four sugar units and the each sugar unit is a member selected from the group consisting of glucose, fucose, digitoxose, digitalose, diginose, rhamnose, talomethylose, antiarose, allomethylose, thevetose, acovenose, acofriose, cymarose, sarmentose, oleandrose and boivinose.

According to the aforementioned process, the furyl steroids can be prepared from corresponding α,β-unsaturated γ-lactones of the following formula:

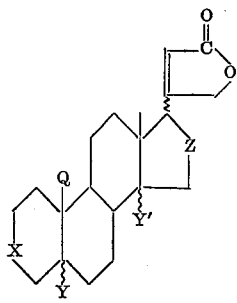

wherein Q, X, Y, Y' and Z each has the same significance as designated above; a double bond can exist between 4- and 5-positions or between 5- and 6-positions; when the double bond exists, the radical represented by Y is absent; further one or two double bonds can exist between 14- and 15-positions or/and 16- and 17-positions; when the double bond exists between 14- and 15-positions, the radical represented by Y' is absent; when the double bond exists between 16- and 17-positions, the radical represented by Z is ≥CH; and the ripple mark (∼) is a generic indication of both α- and β-configurations.

More particularly, specific examples of the starting material include substantially 3β,14-dihydroxy-5β-card-20(22)-enolide (digitoxigenin),
3-oxo-14-hydroxy-5β-card-20(22)-enolide,
3α,14-dihydroxy-5β-card-20(22)-enolide,
3β,14-dihydroxy-5α-card-20(22)-enolide (uzarigenin),
3-oxo-14-hydroxy-5α-card-20(22)-enolide,
3α,14-dihydroxy-5α-card-20(22)-enolide (urezigenin),
3β,5,14-trihydroxy-5β-card-20(22)-enolide (periplogenin),
3β,14,16β-trihydroxy-5β-card-20(22)-enolide (itoxigenin),
3β,14,16β-trihydroxy-19-oxo-5β-card-20(22)-enolide adonitoxigenin),
3β,5,14-trihydroxy-19-oxo-5β-card-20(22)-enolide (strophanthidin),
3β,5,14,19-tetrahydroxy-5β-card-20(22)-enolide strophanthidol),
3β,14-dihydroxy-19-oxo-5α-card-20(22)-enolide (corotoxigenin),
3β,14,19-trihydroxy-5α-card-20(22)-enolide (coroglaucigenin),
3β-hydroxy-5β,17α-card-20(22)-enolide,
3β,5,14-trihydroxy-5β,17α-card-20(22)-enolide (alloperiplogenin),
3β,5,14-trihydroxy-19-oxo-5β,17α-card-20(22)-enolide (allostrophanthidin),
3-oxo-14-hydroxycarda-4,20(22)-dienolide,
3β-hydroxy-5β-carda-14,20(22)-dienolide,
3β,14-dihydroxy-5β-carda-5,20(22)-dienolide,
3β,16β-dihydroxy-5-β-carda-14,20(22)-dienolide,
3β-hydroxy-5β,14α-card-20(22)-enolide,
3β,14-dihydroxy-5β-carda-16,20(22)-dienolide,
3β-hydroxy-5β-carda-14,20(22)-dienolide,
3β-hydroxy-5β-carda-14,16,20(22)-trienolide,
digitoxigenin 3-monodigitoxoside,
digitoxigenin 3-didigitoxoside,
digitoxin and purpurea glycoside A.

The hydroxy radicals of the starting material may be properly acylated, but the acyloxy radicals are in general reduced into hydroxyl radicals simultaneously with the reduction of the lactone ring. So, reacylation is requisite to obtain the acylated furyl steroids. On the other hand, the oxo radicals at 3-, 16- and/or 19-positions are also reduced by the reducing agent into hydroxyl radicals. When such a reduction of the oxo radical is undesirable, it should be protected, for instance, by ketallization with a lower alkanol (e.g., methanol, ethanol), ethylene glycol, propylene glycol or propane-1,3-diol. The acylations, ketallizations and removals of the ketal group can be achieved according to conventional manners in the art.

As the objective furyl steroids, there can be exampled

17β-(3-furyl)-5β,14β-androstane-3β,14-diol,14-hydroxy-
17β-(3-furyl)-5β,14β-androstan-3-one,
17β-(3-furyl)-5β,14β-androstane-3α,14-diol,
17β-(3-furyl)-5α,14β-androstane-3β,14-diol,
14-hydroxy-17β-(3-furyl)-5α,14β-androstan-3-one,
17β-(3-furyl)-5α,14β-androstane-3α,14-diol,
17β-(3-furyl)-5β,14β-androstane-3β,5,14-triol,
17β-(3-furyl)-5β,14β-androstane-3β,14,16β-triol,
3β,14,16β-trihydroxy-17β-(3-furyl)-5β,14β-androstan 19-al,
3β,5,14-trihydroxy-17β-(3-furyl)-5β,14β-androstan-19-al,
17β-(3-furyl)-5β,14β-androstane-3β,5,14,19-tetraol,
3β,14-dihydroxy-17β-(3-furyl)-5α,14β-androstan-19-al,
17β-(3-furyl)-5α,14β-androstane-3β,14,19-trial,
17α-(3-furyl)-5β,14β-androstan-3β-ol,
17α-(3-furyl)-5β,14β-androstane-3β,5,14-triol,
3β,5,14-trihydroxy-17α-(3-furyl)-5β,14β-androstan-19-al,
17β-(3-furyl)-14β-androst-4-en-3-one,
17β-(3-furyl)-5β-androst-14-en-3β-ol,
17β-(3-furyl)-5β,14β-androst-5-ene-3β,14-diol,
17β-(3-furyl)-5β-androst-14-ene-3β,16β-diol,
17β-(3-furyl)-5β-androstan-3β-ol,
17-(3-furyl)-5β,14β-androst-16-ene-3β,14-diol,
17β-(3-furyl)-5β-androst-14-en-3β-ol,
17-(3-furyl)-5β-androsta-14,16-dien-3β-ol,
17β-(3-furyl)-5β,14β-androstane-3β,14-diol-3-monodigitoxoside,
17β-(3-furyl)-5β,14β-androstane-3β,14-diol-3-didigitoxoside,
17β-(3-furyl)-5β,14β-androstane-3β,14-diol-3-tridigitoxoside, and
17β-(3-furyl)-5β,14β-androstane-3β,14-diol-3-tridigitoxosyl-+-monoglucoside.

The above described furyl steroids are useful as androgenic, anabolic or growth-promoting agents. For instance, 17β-(3-furyl)-5β-androst-14-en-3β-ol promoted the body growth accompanying the weight increases of liver, kidney, spleen, pituitary, thyroid, thymus, testes, seminal vesicle and ventral prostate, when subcutaneously administered to male mice at a dose of 1 mg./day for 10 consecutive days. They can be administered in a variety of per se conventional ways, e.g., in the form of tablets constituted, e.g., by an effective amount of a compound of the present invention and a certain proportion of a per se conventional carrier. They can also be blended into feeds to promote the growth of various domestic animals.

Furthermore, among the other furan compounds newly prepared according to the present invention, for instance, 4'-methylfuro[3',2'-2,3]-5α-androst-2-en-17β-ol acetate is useful as antiestrogenic agent and 3,4-dimethoxy-4',17-dimethylfuro[2',3'-6,7]-Δ⁶-morphinan can be used as sedative, analgesic or anti-tussive agent.

The following examples represent presently-preferred embodiments of the present invention, but it is to be understood that the examples are given by way of illustration only and not of limitation. Parts by weight bear the same relation to parts by volume as do grams to millilitres. Temperatures are set forth in degrees centigrade. The abbreviations have conventional significances.

EXAMPLE 1

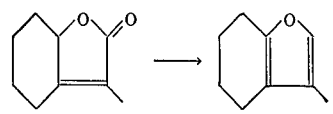

To a solution of 3-methyl-2,4,5,6,7,7a-hexahydrobenzofuran-2-one (4.0 parts by weight) in dry tetrahydrofuran (10 parts by volume) is added dropwise a 19.8% solution (21 parts by volume) of diisobutyl aluminum hydride in dry tetrahydrofuran with stirring at −20 to −25° C. in atmosphere of nitrogen and the resultant mixture is stirred at the same temperature for 30 minutes. To the reaction mixture is added 2 N sulfuric acid (5 parts by volume), then a small amount of water and extracted with ether. The ether extract is washed with sodium hydrogen carbonate solution and water, dried over anhydrous sodium sulfate and evaporated. The residue is chromatographed on neutral alumina (activity II) to give 3-methyl-4,5,6,7-tetrahydrobenzofuran (1.64 parts by weight) as a colorless oil boiling at 55° C./8 mm. Hg. $n_D^{20}$ 1.4896.

UV: $\lambda_{max}^{heptane}$ 222.5 mμ (ε: 6280). IR: $\nu_{max}^{film}$ 1645, 1574, 890, 725, cm.$^{-1}$

*Analysis.*—Calcd. for $C_9H_{12}O$: C, 79.37; H, 8.88. Found: C, 79.71; H, 9.12.

In addition, the starting material (0.65 part by weight) is recovered.

EXAMPLE 2

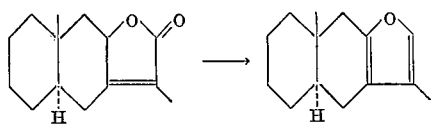

To a solution of dl-3,8a-dimethyl-trans-2,4,4a,5,6,7,8, 8a,9,9a-decahydronaphtho[2,3-b]furan-2-one (2.08 parts by weight) in dry tetrahydrofuran (25 parts by volume) is added dropwise a 23.6% solution (25 parts by volume) of diisobutyl aluminum hydride in dry tetrahydrofuran with stirring at −20 to −25° C. in an atmosphere of nitrogen and the resultant mixture is stirred at the same temperature for 30 minutes. Working up in the similar manner to the Example 1, the crude product is recrystallized from pentane to give dl-3,8a-dimethyl-trans-4,4a,5, 6,7,8,8a,9-octahydronaphtho[2,3-b]furan (1.504 parts by weight) as colorless prisms melting at 35 to 37.5° C.

UV; $\lambda_{max}^{heptane}$ 222.5 mμ (ε: 6860). IR: $\nu_{max}^{film}$ 1645, 1570, 757, 728 cm.$^{-1}$

*Analysis.*—Calcd. for $C_{14}H_{20}O$: C, 82.30; H, 9.87. Found: C, 82.24; H, 10.03.

In addition, the starting material (0.27 part by weight) is recovered.

The starting material of this example can be prepared by refluxing dl-9-methyl-trans-decalone [W. Nagata and I. Kikkawa: Chem. Pharm. Bull. (Tokyo), 11, 289 (1963)] with pyrrolidine in benzene, subjecting the resultant enamine to an alkylation with ethyl α-bromopropionate followed by a hydrolysis with 5% potassium hydroxide-methanol and treating the resultant keto-acid with acetic anhydride containing sodium acetate under refluxing, and is constituted by colorless plates melting at 80 to 81° C., when recrystallized from ether.

EXAMPLE 3

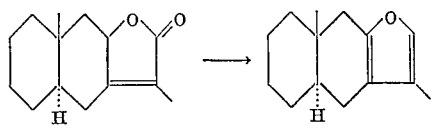

To a solution of dl-3,8a-dimethyl-trans-2,4,4a,5,6,7,8, 8a,9,9a-decahydronaphtho[2,3-b]furan-2-one (3.8 parts by weight in dry tetrahydrofuran (50 parts by volume) is added dropwise a 6.7% solution (16.3 parts by volume) of diethyl aluminum hydride in dry tetrahydrofuran with stirring at −20 to −25° C. in an atmosphere of nitrogen and the resultant mixture is stirred at the same temperature for 30 minutes. Working up in the similar manner to the Example 1, the crude product is recrystallized from pentane to give dl-3,8a-dimethyl-trans-4,4a,5,6, 7,8,8a,9-octahydronaphtho[2,3-b]furan (1.63 parts by weight) being identical with the product of the Example 2.

In addition, the starting material (1.18 parts by weight) is recovered.

EXAMPLE 4

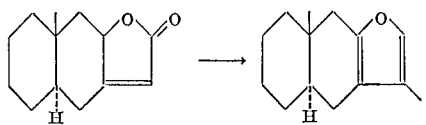

To a solution of dl-3,8a-dimethyltrans-2,4,4a,5,6,7,8, 8a,9,9a-decahydronaphtho[2,3-b]furan-2-one (11.0 parts by weight) in dry tetrahydrofuran (150 parts by volume) is added portionwise lithium aluminum hydride (1.9 parts by weight) with stirring at −50 to −60° C. and the resultant mixture is stirred at the same temperature for 1 hour. Working up in the similar manner to the Example 1, there is obtained dl-3,8a-dimethyl-trans-4,4a,5,6,7, 8,8a,9-octahydronaphtho[2,3-b]furan (1.0 part by weight) being identical with the product of the Example 2.

EXAMPLE 5

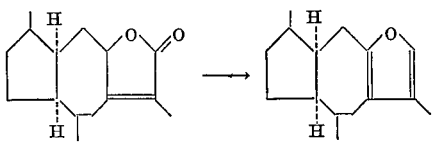

To a solution of l-3,5β,8β-trimethyl-2,4,5,5aα,6,7,8,8aα, 9,9a-decahydroazuleno[5,6-b]furan-2-one (7.8 parts by weight) in dry tetrahydrofuran (100 parts by volume) is added dropwise a 19.3% solution (24.4 parts by volume) of diisobutyl aluminum hydride in dry tetrahydrofuran with stirring at −20 to −25° C. in an atmosphere of nitrogen and the resultant mixture is stirred at the same temperature for 30 minutes. Working up in the similar manner to the Example 1, there is obtained l-3,5β,8β-trimethyl - 4,5,5aα,6,7,8,8aα,9 - octahydroazuleno[5,6 - b] furan (5.1 parts by weight) as a colorless oil boiling at 110° C./1.5 mm. Hg. $n_D^{20}$ 1.5114.

UV: $\lambda_{max}^{heptane}$ 225 mμ (ε: 6980). IR: $\nu_{max}^{film}$ 1642, 1570, 760, 725 cm.$^{-1}$

*Analysis.*—Calcd. for $C_{15}H_{22}O$: C, 82.51; H, 10.16. Found: C, 82.77; H, 10.32.

In addition, the starting material (1.4 parts by weight) is recovered.

The starting material of this example can be prepared by refluxing l-3β,8β-dimethyl-3aα,8aα-perhydroazulen-5-one [K. Takeda, H. Minato, T. Terasawa and C. Yanaihara: Chem. Pharm. Bull. (Tokyo), 13, 942 (1965)] with pyrrolidine in benzene, subjecting the resultant enamine to an alkylation with ethyl α-bromopropionate followed by a hydrolysis with 5% potassium hydroxide-methanol and treating the resultant keto-acid with acetic anhydride containing sodium acetate under refluxing, and is constituted by colorless needles melting at 100 to 101° C., when recrystallized from petroleum ether.

EXAMPLE 6

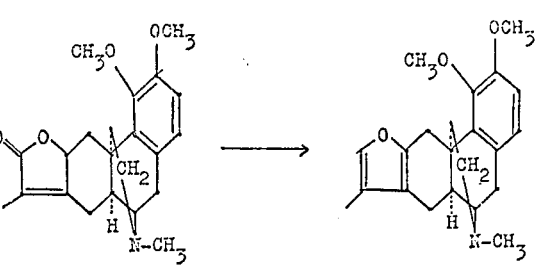

To solution of 3,4-dimethoxy-4',17-dimethyl-2',5'-dihydrofuro[2',3':6,7]morphinan-5'-one (3.0 parts by weight) in dry tetrahydrofuran (40 parts by volume) is added dropwise a 11.8% solution (20 parts by volume) of diisobutyl aluminum hydride in dry tetrahydrofuran with stirring at −20 to −25° C. in an atmosphere of nitrogen and the resultant mixture is stirred at the same temperature for 30 minutes. Working up in the similar manner to the Example 1, there is obtained 3,4-dimethoxy-4',17-dimethylfuro[2',3':6,7] - Δ⁶ - morphinan as colorless oily substance.

IR: $\nu_{max}^{film}$ 1649, 1565 cm.⁻¹

The starting material of this example can be prepared by subjecting 3,4-dimethoxy-6-acetoxy-17-methylmorphinan-7-one (Yakugaku Zasshi, 82, 1512 (1962)) to the Reformatsky reaction with ethyl α-bromopropionate and chromatographing the resultant crude products on alumina, and is constituted by colorless prisms melting at 158° C., when recrystallized from chloroform-methanol.

EXAMPLE 7

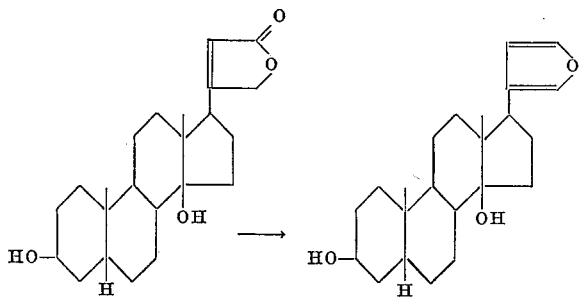

To a solution of 3β,14-dihydroxy-5β-card-20(22)-enolide (digitoxigenin) (48.5 parts by weight) in dry tetrahydrofuran (1000 parts by volume) is added dropwise a 19.3% solution (317 parts by volume) of diisobutyl aluminum hydride in dry tetrahydrofuran with stirring at −20 to −25° C. in an atmosphere of nitrogen and the resultant mixture is stirred at the same temperature for 30 minutes. Working up in the similar manner to the Example 1, the crude product is recrystallized from chloroform to give 17β-(3-furyl)-5β,14β-androstane-3β,14-diol (28.0 parts by weight) as colorless prisms melting at 208 to 209° C.

UV: $\lambda_{max}^{EtOH}$ 212.5 mμ (ε: 4590). IR: $\nu_{max}^{CHCl_3}$ 1580, 1504, 870 cm.⁻¹

Analysis.—Calcd. for C₂₃H₃₄O₃: C, 77.05; H, 9.56. Found: C, 76.76; H, 9.67.

In addition, the starting material (261 parts by weight) is recovered.

EXAMPLE 8

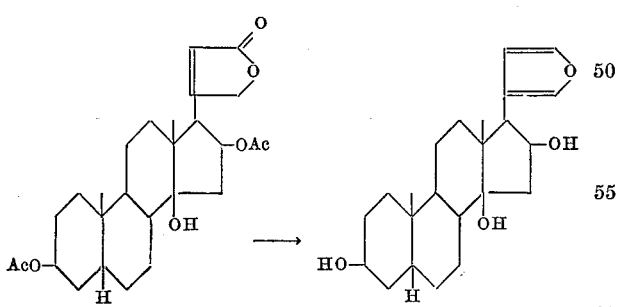

To a solution of 3β,16β-diacetoxy-14-hydroxy-5β-card-20(22)-enolide (gitoxigenin) (50.0 parts by weight) in dry tetrahydrofuran (350 parts by volume) is added a 17.3% solution (350 parts by volume) of diisobutyl aluminum hydride in dry tetrahydrofuran with stirring at −20 to −25° C. in an atmosphere of nitrogen and the resultant mixture is stirred at the same temperature for 30 minutes. Working up in the similar manner to the Example 1, the crude product is recrystallized from chloroform-ether to give 17β-(3-furyl)-5β,14β-androstane-3β,14,16β-triol (18.5 parts by weight) as colorless prisms melting at 247 to 249° C. (decomp.).

UV: $\lambda_{max}^{EtOH}$ 212.5 mμ (ε: 5340). IR: $\nu_{max}^{CHCl_3}$ 1580, 1504, 871 cm.⁻¹

Analysis.—Calcd. for C₂₃H₃₄O₄·1/2H₂O: C, 72.20; H, 9.14. Found: C, 72.67; H, 9.13.

In addition, 3β,14,16β-trihydroxy-5β-card-20(22)-enolide (15.5 parts by weight) is recovered.

EXAMPLE 9

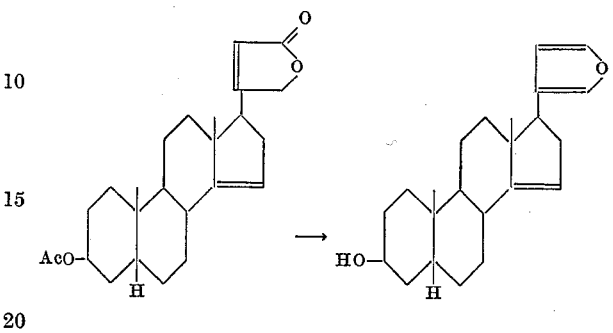

To a solution of 3β-acetoxy-5β-carda-14,20(22)-dienolide (prepared according to the method described in Helv. Chim. Acta, 43, 145 (1960), M.P. 182–184° C.) (18.0 parts by weight) in dry tetrahydrofuran (250 parts by volume) is added dropwise a 20.2% solution (79 parts by volume) of diisobutyl aluminum hydride in dry tetrahydrofuran with stirring at −20 to −25° C. in an atmosphere of nitrogen and the resultant mixture is stirred at the same temperature for 30 minutes. Working up in the similar manner to the Example 1, there are obtained 17β-(3-furyl)-5β-androst-14-en-3β-ol (11.0 parts by weight) as colorless needles melting at 140 to 142° C. (recrystallized from ethanol) and 3β-acetoxy-17β-(3-furyl)-5β-androst-14-ene (0.84 part by weight) as colorless needles melting at 145 to 148° C. (recrystallized from ethanol).

Analysis.—Calcd. for C₂₅H₃₄O₃ (acetate): C, 78.49; H, 8.96. Found: C, 78.33; H, 8.93.

In addition, the starting material (4.5 parts by weight) is recovered by reacetylation.

EXAMPLE 10

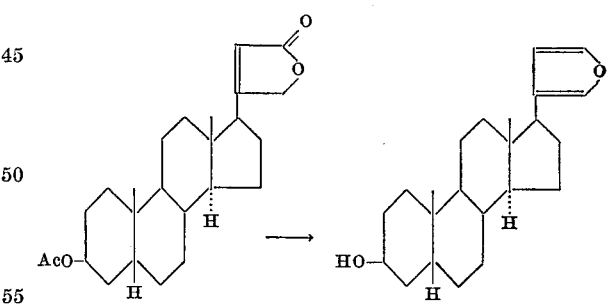

To a solution of 3β-acetoxy-5β,14α-card-20(22)-enolide (2.18 parts by weight) derived by a conventional acetylation from 3β-hydroxy-5β,14α-card-20(22)-enolide (prepared according to the method described in Chem. Pharm. Bull. (Tokyo), 13, 312 (1965), M.P. 224–225° C.) in dry tetrahydrofuran (40 parts by volume) is added dropwise a 20.2% solution (10.8 parts by volume) of diisobutyl aluminum hydride in dry tetrahydrofuran with stirring at −20 to −25° C. in an atmosphere of nitrogen and the resultant mixture is stirred at the same temperature for 30 minutes. Working up in the similar manner to the Example 1, there are obtained 17β-(3-furyl)-5β-androstan-3β-ol (0.85 part by weight) as colorless prisms melting at 128 to 130° C. (recrystallized from ethanol) and 3β-acetoxy-17β-(3-furyl)-5β-androstane (0.40 part by weight) as colorless prisms melting at 123 to 125° C. (recrystallized from ethanol).

Analysis.—Calcd. for C₂₅H₃₆O₃ (acetate): C, 80.65; H, 10.01. Found: C, 80.61; H, 10.09.

EXAMPLE 11

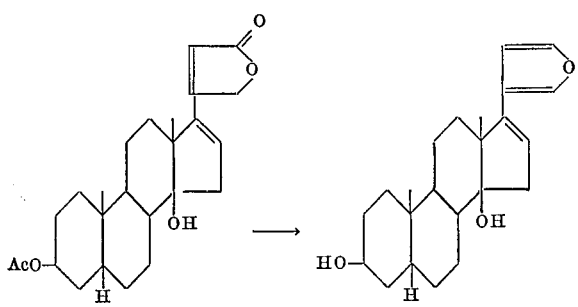

To a solution of 3β-acetoxy-14-hydroxy-5β-carda-16,20(22)-dienolide (prepared according to the method described in Helv. Chim. Acta, 29, 718 (1946), M.P. 207–208° C.) (3.0 parts by weight) in dry tetrahydrofuran (60 parts by volume) is added dropwise a 20.2% solution (23 parts by volume) of diisobutyl aluminum hydride in dry tetrahydrofuran with stirring at −20 to −25° C. in an atmosphere of nitrogen and the resultant mixture is stirred at the same temperature for 30 minutes. Working up in the similar manner to the Example 1, there are obtained 17-(3-furyl)-5β,14β-androst-16-ene-3β,14-diol (0.55 part by weight) as colorless prisms melting at 120 to 131° C. (recrystallized from chloroform-ether) and 3β-acetoxy-17-(3-furyl)-5β,14β-androst-16-en-14-ol (0.50 part by weight) as colorless prisms melting at 145 to 148° C. (recrystallized from chloroform-ether).

*Analysis.*—Calcd. for $C_{23}H_{32}O_4$ (acetate): C, 77.49; H, 9.05. Found: C, 77.17; H, 9.11.

EXAMPLE 12

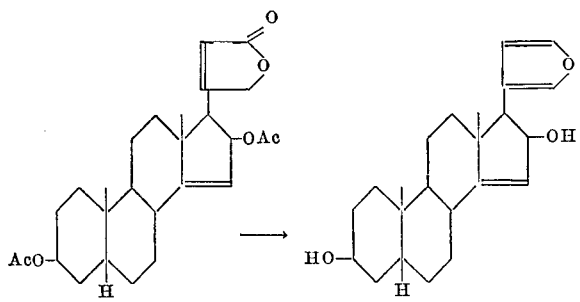

To a solution of 3β,16β-diacetoxy-5β-carda-14,20(22)-dienolide (prepared according to the method described in Helv. Chim. Acta, 42, 977 (1959), M.P. 158–160° C./187–190° C.) (3.6 parts by weight) in dry tetrahydrofuran (50 parts by volume) is added dropwise a 20.2% solution (22.1 parts by volume) of diisobutyl aluminum hydride in dry tetrahydrofuran with stirring at −20 to −25° C. in an atmosphere of nitrogen and the resultant mixture is stirred at the same temperature for 30 minutes. Working up in the similar manner to the Example 1, the crude product is recrystallized from ethanol to give 17β-(3-furyl)-5β-androst-14-ene-3β,16β-diol (2.0 parts by weight) as colorless needles melting at 168–171° C.

*Analysis.*—Calcd. for $C_{23}H_{32}O_3$: C, 77.49; H, 9.05. Found: C, 77.53; H, 9.11.

EXAMPLE 13

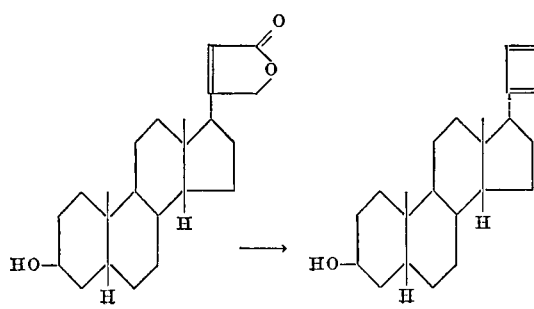

To a solution of 3β-hydroxy-5β,17α-card-20(22)-enolide (prepared according to the method described in Chem. Pharm. Bull. (Tokyo), 13, 312 (1965), M.P. 198–200° C.) (5.25 parts by weight) in dry tetrahydrofuran (100 parts by volume) is added dropwise a 20.2% solution (28.8 parts by volume of diisobutyl aluminum hydride in dry tetrahydrofuran with stirring at −20 to −25° C. in an atmosphere of nitrogen and the resultant mixture is stirred at the same temperature for 30 minutes. Working up in the similar manner to the Example 1, the crude product is recrystallized from ethanol to give 17α-(3-furyl)-5β,14β-androstan-3β-ol (3.60 parts by weight) as colorless needles melting at 152 to 153.5° C.

*Analysis.*—Calcd. for $C_{23}H_{34}O_2$: C, 80.65; H, 10.01. Found: C, 80.37; H, 10.03.

In addition, the starting material (1.5 parts by weight) is recovered.

EXAMPLE 14

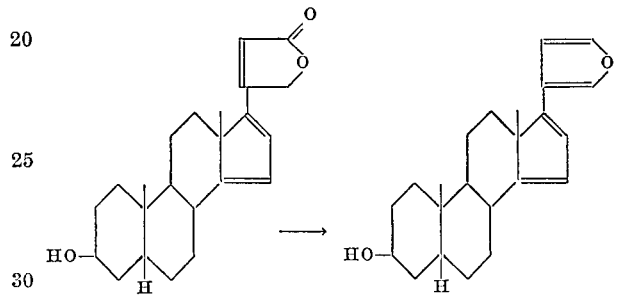

To a solution of 3β-hydroxy-5β-carda-14,16,20(22)-trienolide (prepared according to the method described in Chem. Pharm. Bull. (Tokyo), 13, 312 (1965), M.P. 209–211° C.) (7.65 parts by weight) in dry tetrahydrofuran (100 parts by volume) is added dropwise to a 20.2% solution (33.3 parts by volume) of diisobutyl aluminum hydride in dry tetrahydrofuran with stirring at −20 to −25° C. in an atmosphere of nitrogen and the resultant mixture is stirred at the same temperature for 30 minutes. Working up in the similar manner to the Example 1, the crude product is recrystallized from ethanol to give 17-(3-furyl)-5β-androsta-14,16-dien-3β-ol (3.2 parts by weight) as colorless needles melting at 145 to 147° C.

*Analysis.*—Calcd. for $C_{23}H_{30}O_2$: C, 81.61; H, 8.93. Found: C, 81.65; H, 9.03.

In addition, the starting material (3.15 parts by weight) is recovered.

EXAMPLE 15

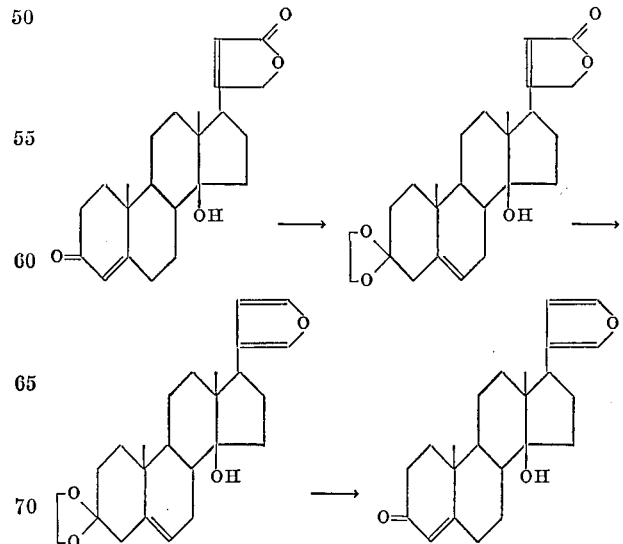

3-oxo-14-hydroxycarda-4,20(22)-dienolide (prepared according to the method described in Yakugaku Zasshi, 80, 1314 (1960), M.P. 231–237° C.) is subjected to a conventional ketallization procedure, i.e., refluxing in benzene containing ethylene glycol and p-toluenesulfonic acid, to obtain 3,3-ethylenedioxy-14-hydroxycarda-5,20 (22)-dienolide as colorless oily substance. To a solution of thus prepared 3,3-ethylenedioxy-14-hydroxycarda-5,20 (22)-dienolide (1.7 parts by weight) in dry tetrahydrofuran (60 parts by volume) is added dropwise a 20.2% solution (7.2 parts by volume) of diisobutyl aluminum hydride in dry tetrahydrofuran with stirring at −20° to −25° C. in an atmosphere of nitrogen and the resultant mixture is stirred at the same temperature for 30 minutes. Working up in the similar manner to the Example 1, there are obtained 3,3 - ethylenedioxy - 17β-(3-furyl)-14β-androst-5-en-14-ol (0.25 part by weight) as colorless prisms melting at 136 to 138° C. (recrystallized from ether) and 14 - hydroxy-17β-(3-furyl)-14β-androst-4-en-3-one (0.35 part by weight) as colorless prisms melting at 184 to 186° C. (recrystallized from ether).

Analysis.—Calcd. for $C_{25}H_{34}O_4$(ketal): C, 74.57; H, 8.87. Found: C, 74.95; H, 8.60.

3,3-ethylenedioxy-17β-(3-furyl)-14β-androst-5-en-14-ol is quantitatively transformed to 14-hydroxy-17β-(3-furyl)-14β-androst-4-en-3-one by treatment with an acid according to a conventional manner.

In addition, the starting material (1.45 parts by weight) is recovered.

EXAMPLE 16

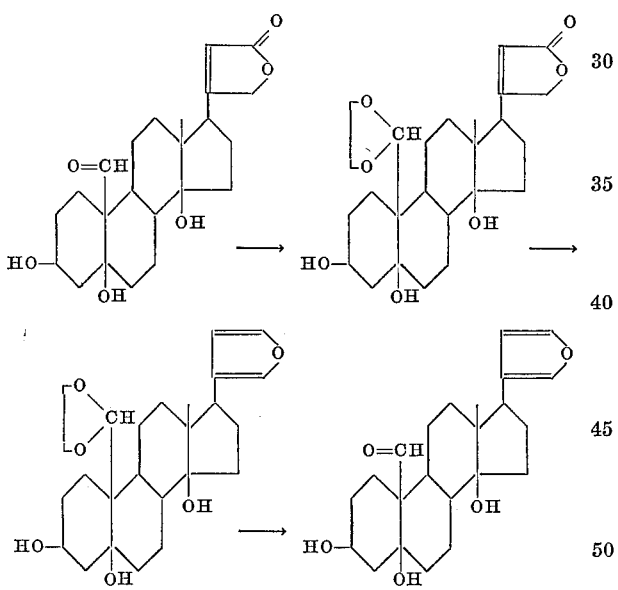

3β,5,14 - trihydroxy - 19 - oxo-5β-card-20(22)-enolide (strophanthidin) is treated with ethyleneglycol containing p-toluenesulfonic acid at a room temperature to obtain 3β,5,14 - trihydroxy-19,19-ethylenedioxy-5β-card-20 (22)-enolide. To a solution of thus prepared 3β,5,14-trihydroxy - 19,19 - ethylenedioxy - 5β-card-20(22)-enolide (1.90 parts by weight) in dry tetrahydrofuran (20 parts by volume) is added dropwise a 20.2% solution (14.8 parts by volume) of diisobutyl aluminum hydride in dry tetrahydrofuran with stirring at −20° to −25° C. in an atmosphere of nitrogen and the resultant mixture is stirred at the same temperature for 30 minutes. Working up in the similar manner to the Example 1, the crude product is recrystallized from chloroform-ether to give 3β,5,14-trihydroxy-17β-(3-furyl)-5β,14β-androstan-19-al (0.97 part by weight) as colorless prisms melting at 183 to 185° C.

Analysis.—Calcd. for $C_{23}H_{32}O_5$: C, 71.10; H, 8.30. Found: C, 71.05; H, 8.10.

In addition, there is also obtained 3β,5,14-trihydroxy-17β - (3 - furyl) - 19,19-ethylenedioxy-5β,14β-androstane (0.15 part by weight), which is quantitatively transformed to the aldehyde by treatment with an acid according to the conventional manner.

EXAMPLE 17

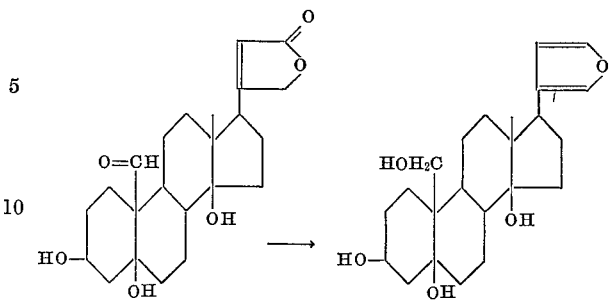

To a solution of 3β,5,14-trihydroxy-19-oxo-5β-card-20 (22)-enolide (strophanthidin) (1.2 parts by weight) in dry tetrahydrofuran (20 parts by volume) is added dropwise a 20.2% solution (11.8 parts by volume) of diisobutyl aluminum hydride in dry tetrahydrofuran with stirring at −20° to −25° C. in an atmosphere of nitrogen and the resultant mixture is stirred at the same temperature for 30 minutes. Working up in the similar manner to the Example 1, there is obtained 17β-(3-furyl)-5β,14β-androstane-3β,5,14,19-tetraol (0.8 part by weight) as a colorless amorphous powder.

IR: $\nu_{max.}^{CHCl_3}$ 1508, 1142, 1020, 977, 955, 890, 870, 840 cm.$^{-1}$

In an analogous manner, 17β-(3-furyl)-5β,14β-androstane-3β,5,14,19-tetraol is prepared from 3β,5,14,19-tetrahydroxy-5β-card-20(22)-enolide (strophanthidol) in 90% yield.

EXAMPLE 18

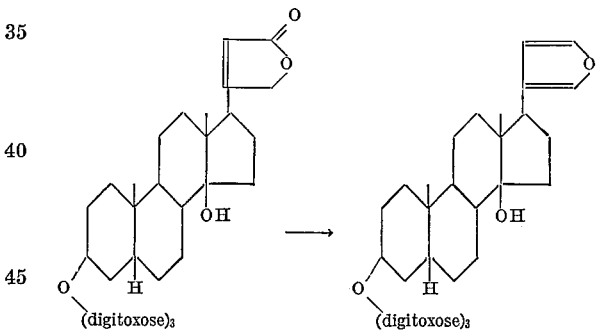

To a solution of digitoxin (2.0 parts by weight) in dry tetrahydrofuran (140 parts by volume) is added dropwise a 20.2% solution (12.9 parts by volume) of diisobutyl aluminum hydride in dry tetrahydrofuran with stirring at −20 to −25° C. in an atmosphere of nitrogen and the resulting mixture is stirred at the same temperature for 30 minutes. Working up in the similar manner to the Example 1, the crude product is recrystallized from methanol-chloroform to give 17β-(3-furyl)-5β,14β-andostane-3β,14-diol 3-tridigitoxoside (0.75 part by weight) as a colorless powder melting at 232 to 240° C.

In addition, the starting material (0.80 part by weight) is recovered.

EXAMPLE 19

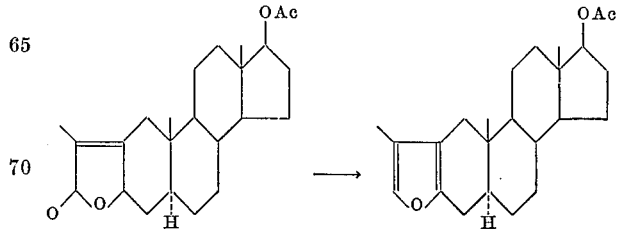

To a solution of 4'-methyl-17β-acetoxy-3,5'-dihydrofuro[3',2':2,3]-5α-androst-2-en-5'-one (10.35 parts by weight) in dry tetrahydrofuran (150 parts by volume) is added dropwise a 20.2% solution (70 parts by volume) of diisobutyl aluminum hydride in dry tetrahydrofuran with stirring at −20 to −25° C. in an atmosphere of nitrogen and the resultant mixture is stirred at the same temperature for 30 minutes. Working up in the similar manner to the Example 1, the crude product is acetylated with acetic anhydride-pyridine and recrystallized from ether to give 4′-methyl-17β-acetoxyfuro[3′,2′:2,3]-5α-androst-2-ene (9.30 parts by weight) as colorless prisms melting at 155 to 157° C.

*Analysis.*—Calcd. for $C_{24}H_{34}O_3$: C, 77.80; H, 9.25. Found: C, 77.58; H, 9.21.

4′-methyl-17β-acetoxyfuro[3′,2′:2,3]-5α-androst-2-ene is quantitatively transformed to 4′-methylfuro[3′,2′:2,3]-5α-androst-2-en-17β-ol by an alkaline hydrolysis with 5% potassium hydroxide-methanol according to a conventional manner.

The starting material of this example can be prepared by refluxing 17β-acetoxy-5α-androstan-3-one with pyrrolidine in benzene, subjecting the resultant enamine to an alkylation with ethyl α-bromopropionate followed by a hydrolysis with 5% potassium hydroxide-methanol and treating the resultant keto-acid with acetic anhydride containing sodium acetate under refluxing, and is an oily substance.

What is claimed is:

1. A process for preparing furan compounds which comprises reducing an α,β-unsaturated γ-lactone compound with an aluminum compound of the following formula:

$$M_nAlR_mH_{(n+3)-m}$$

wherein M is an alkali metal, R is a member selected from the group consisting of lower alkyl and lower alkoxy, n is an integer from 0 to 1, and m is an integer from 0 to 3 when n is 0, and m is an integer from 0 to 4 when n is 1, in an inert solvent to obtain a furan compound.

2. A process according to claim 1, wherein the reduction is carried out at a temperature from about −80° C. to a reflux temperature.

3. A process according to claim 1, wherein the inert solvent is selected from the group consisting of a liquid hydrocarbon, a di-lower-alkyl ether, diglyme, tetrahydrofuran, tetrahydropyran and dioxane.

4. A process according to claim 1, wherein the aluminum compound is a di-lower-alkyl aluminum hydride.

5. A process according to claim 1, wherein the aluminum compound is a di-lower-alkyl aluminum hydride and the reduction is carried out in an atmosphere of an inert gas.

6. A process according to claim 1, wherein the aluminum compound is an alkali metal aluminum hydride.

7. A process according to claim 1, wherein the α,β-unsaturated lactone compound is selected from the group consisting of aliphatic, alicyclic and heterocyclic α,β-unsaturated lactone compounds.

8. A compound selected from the group consisting of compounds of the formulae:

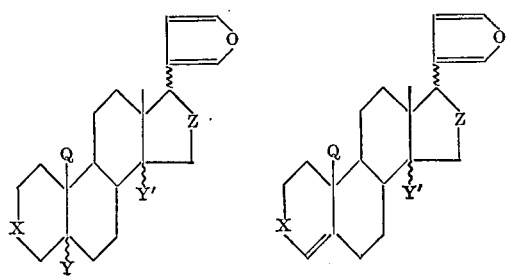

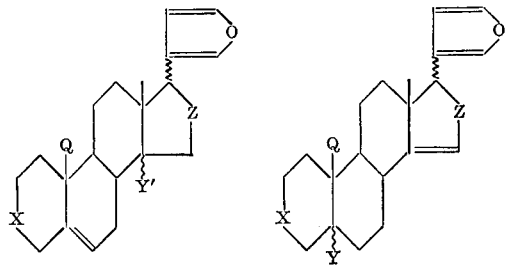

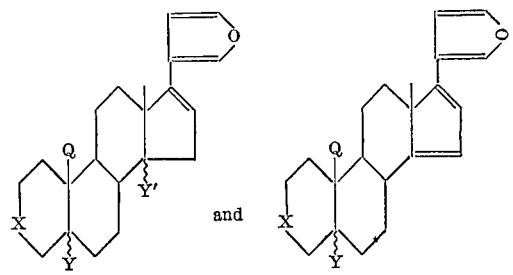

and wherein Q is a member selected from the group consisting of methyl, hydroxymethyl, lower-alkanoyloxymethyl, formyl and lower-alkylenedioxymethyl, X is a member selected from the group consisting of α-hydroxymethylene, β-hydroxymethylene, α-lower-alkanoyloxymethylene, β-lower-alkanoyloxymethylene, α-glycosyloxymethylene having up to four sugar units, β-glycosyloxymethylene having up to four sugar units, carbonyl and lower-alkylenedioxymethylene, Y and Y′ each is a member selected from the group consisting of hydrogen and hydroxy, Z is a member selected from the group consisting of methylene, α-hydroxymethylene, β-hydroxymethylene, α-lower-alkanoyloxymethylene and β-lower-alkanoyloxymethylene, and the ripple mark (∼) is a generic indication of α- and β-configurations, X being carbonyl in the case of Δ⁴-unsaturation and being not carbonyl in the case of Δ⁵-unsaturation.

9. A compound according to claim 8, namely, 17β-(3-furyl)-5β,14β-androstane-3β,14-diol.

10. A compound according to claim 8, namely, 17β-(3-furyl)-5β,14β-androstane-3β,14-diol-3-tridigitoxoside.

11. A compound according to claim 8, namely, 17β-(3-furyl)-5β-androstan-3β-ol.

12. A compound according to claim 8, namely, 3β-lower-alkanoyloxy-17β-(3-furyl)-5β-androstane.

13. A compound according to claim 8, namely, 17α-(3-furyl)-5β,14β-androstan-3β-ol.

14. A compound according to claim 8, namely, 3β,5,14-trihydroxy-17β-(3-furyl)-5β,14β-androstan-19-al.

15. A compound according to claim 8, namely, 3β,5,14-trihydroxy-17β-(3-furyl)-19,19-lower alkylene-dioxy-5β,14β-androstane.

16. A compound according to claim 8, namely, 17β-(3-furyl)-5β,14β-androstane-3β,5,14,19-tetraol.

17. A compound according to claim 8, namely, 14-hydroxy-17β-(3-furyl)-14β-androst-4-en-3-one.

18. A compound according to claim 8, namely, 3,3-lower-alkylenedioxy-17β-(3-furyl)-14β-androst-5-en-14-ol.

19. A compound according to claim 8, namely, 17β-(3-furyl)-5β,14β-androstane-3β,14,16β-triol.

20. A compound according to claim 8, namely, 17β-(3-furyl)-5β-androst-14-en-3β-ol.

21. A compound according to claim 8, namely, 3β-lower-alkanoyloxy-17β-(3-furyl)-5β-androst-14-ene.

22. A compound according to claim 8, namely, 17β-(3-furyl)-5β-androst-14-ene-3β,16β-diol.

23. A compound according to claim 8, namely, 17-(3-furyl)-5β,14β-androst-16-ene-3β,14-diol.

24. A compound according to claim 8, namely, 3β-lower-alkanoyloxy - 17 - (3 - furyl)-5β,14β-androst-16-en-14-ol.

25. A compound according to claim 8, namely, 17-(3-furyl)-5β-androsta-14,16-dien-3β-ol.

26. A compound 4'-methylfuro[3',2':2,3]-5α-androst-2-en-17β-ol.

27. A compound 4'-methyl-17β-lower-alkanoyloxyfuro-[3',2':2,3]-5α-androst-2-ene.

28. A compound 3,4-dimethoxy - 4',17 - dimethylfuro-[2',3':6,7]-Δ$^6$-morphinan.

References Cited

UNITED STATES PATENTS

| | | | |
|---|---|---|---|
| 2,982,767 | 5/1961 | Kerwin et al. | 260—239.55 |
| 3,165,511 | 1/1965 | Wettstein et al. | 260—239.55 |

LEWIS GOTTS, *Primary Examiner.*

JOHNNIE R. BROWN, *Assistant Examiner.*

U.S. Cl. X.R.

260—239.55, 239.57, 285, 346.2, 999